April 14, 1953  J. R. T. CLINGAN  2,634,690
HOLDING MEANS FOR WHEELED VEHICLES
Filed Feb. 18, 1950
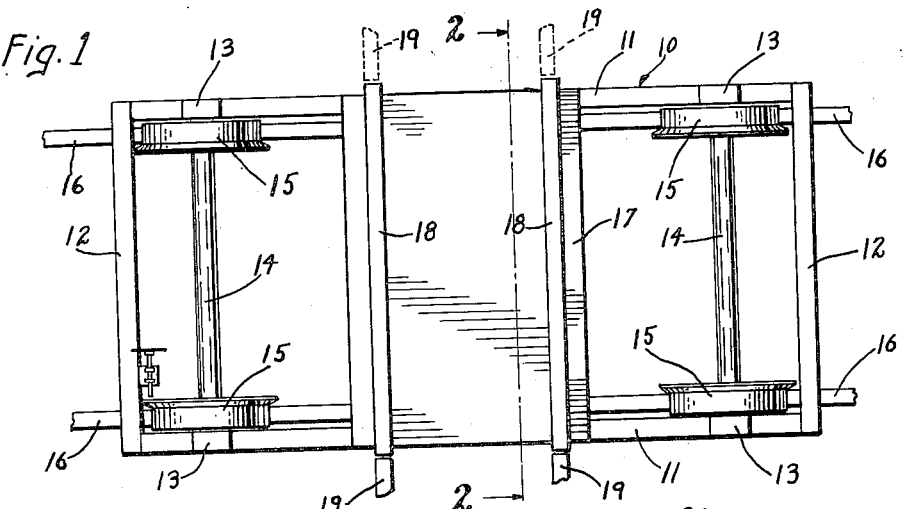
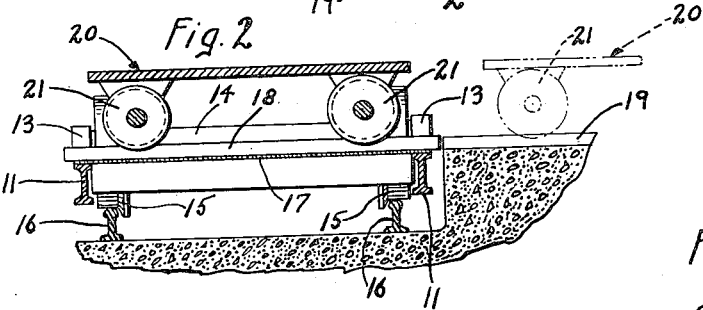
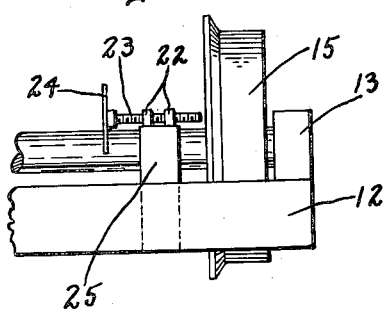
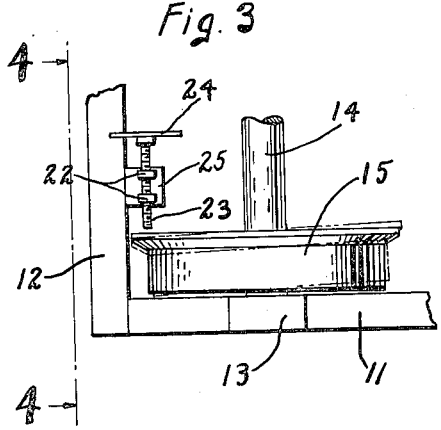
INVENTOR.
John R. T. Clingan
BY
ATTORNEY Patented Apr. 14, 1953

2,634,690

UNITED STATES PATENT OFFICE 2,634,690

HOLDING MEANS FOR WHEELED VEHICLES

John R. T. Clingan, Niles, Ohio

Application February 18, 1950, Serial No. 144,980

2 Claims. (Cl. 104—48)

My invention relates to holding means for a wheeled vehicle, more particularly to holding means for a transfer car which is adapted to selectively move loads along transversely arranged tracks which are disposed at different levels, and the principal object of my invention is to provide new and improved holding means of this character.

My invention has particular application to wheeled vehicles used to transfer loads from one track to another. In the manufacture of brick, particularly relative expensive firebrick, it is necessary to transfer a car carrying a load of uncured brick from the molding station, or a storage station, to the tunnel-kiln station. A transfer car is used for such transferring operations, such transfer car being movable along a track section which is usually transverse to and at different level with the tracks at the molding, storage and tunnel-kiln stations.

The transfer car is moved along its track so that the track section carried thereby may be aligned with the tracks at the molding, storage or tunnel-kiln stations, whereby a car carrying the brick may be moved onto the transfer car, transported to another station, and removed from the transfer car to the tracks at such other station. It will be apparent that great care must be exercised in aligning the track section of the transfer car with the station track, otherwise the brick-carrying car will be derailed, with consequent damage to it and its load. Further, accurate alignment is to no avail unless means are provided to positively hold the transfer car against movement during transferring operations.

Heretofore, it has been customary to use wooden wheel chocks which are wedged between at least one wheel and the wheel track. This method has proven very unsatisfactory since it requires a wedging action which quite frequently causes movement of the transfer car from its aligned position. Also, this method requires a user to work in position substantially under the car and of course the danger exists that such workman may be injured in the event the load shifts and falls. Also, since the chocks were merely loose pieces they were frequently misplaced, or lost, and considerable time was consumed in finding or replacing them. My invention completely eliminates the serious disadvantages of the methods previously used in holding transfer cars in fixed position and provides simple, inexpensive, yet efficient construction for such purpose.

In the drawing accompanying this specification and forming a part of this application, there is shown, for purposes of illustration, an embodiment which my invention may assume, and in this drawing:

Figure 1 is a plan view of a transfer car illustrating an embodiment of my invention, cross tracks being fragmentarily shown, Figure 2 is a fragmentary, sectional view corresponding generally to the line 2—2 of Figure 1, and showing a load car, in full lines, in position on the transfer car, and further showing a load car, in dotted lines, in position on a station track, Figure 3 is an enlarged fragmentary view of a portion of the transfer car, and Figure 4 is a different view of the parts shown in Figure 3, corresponding generally to the line 4—4 of Figure 3.

Referring to the drawing, the embodiment herein shown to disclose the invention comprises a transfer car 10 having a frame which may be constructed of steel structural shapes, such as longitudinally extending I-beams 11 and transversely extending angle-pieces 12 which are welded or otherwise suitably secured to the I-beams.

Pairs of aligned bearings 13 are carried by the I-beams 11, each pair of bearings providing a journal for opposite ends of a shaft 14. A pair of flanged wheels 15 is carried by each shaft 14, these wheels being spaced-apart a desired amount in accordance with the spacing of the rails of the track 16 on which said wheels ride.

A plate 17 is disposed transversely of the longitudinal I-beams 11, 11, and this plate carries spaced-apart rails forming a track section 18. The track section 18 is adapted to be aligned with rails of a track 19 which may lead to or from the brick molding station, the storage station, or the tunnel-kiln station. As best seen in Figure 2, the tracks 16 and 19 are transverse to each other and are disposed at different levels. The track section 18 is formed of rails of the same cross-sectional size as the rails of the track 19 and is disposed at the level of the track 19.

Thus, a load carrying car 20, having flanged wheels 21 which engage the rails of track section 18 or track 19, may be moved to and from position on the transfer car 10, when the track section 18 is aligned with the track 19.

The molding means herein disclosed comprises a body 25, which may be in the form of a closed steel box made by welding together angle-pieces and closing the ends of the tubular member so formed with end plates. The body 25 may be welded, or otherwise suitably secured, to an angle piece 12 in position adjacent to one of the wheels 15.

A threaded block, a pair of threaded blocks, a nut, or a pair of nuts 22 as herein shown, are welded to the top of the body 25, and a square head set-screw 23 is threaded through the nuts for movement toward and away from the side surface of the wheel 15, the screw 23 being movable in a direction generally parallel to the axis of rotation of the wheel 15 and being adapted to engage the side of the wheel generally near the periphery of the wheel.

A handle 24 is secured to the head of the set-screw 23 whereby considerable force may be applied in the turning movement of the screw. The screw 23 may have a cup-point at its extremity, or may be otherwise suitably shaped so that it may be firmly engaged with wheel surface.

Interengagement of the screw 23 with the wheel 15 is in most cases sufficient to hold the transfer car in proper position relative to or in alignment with the track 19. However, it is possible to draw on the screw a sufficient amount so as to tilt the wheel 15 with respect to the axis of rotation (as shown in dotted lines in Figure 3) and thus cause such wheel to bind on its rail. Such tilting action is possible since close tolerances in the wheel bearings 13 are not required, and of course further tilting is permitted as the wheel bearings wear.

It will be appreciated that a holding means may be positioned for operation with more than one of the wheels and it may be preferred to have holding means at opposite ends of the transfer car so that holding action of the car may be applied from either end.

In view of the foregoing, it will be apparent to those skilled in the art that I have accomplished the principal object of my invention, and it also will be apparent to those skilled in the art that the embodiment herein described may be variously changed and modified without departing from the spirit of the invention, and that the invention is capable of uses and has advantages not herein specifically described; hence it will be appreciated that the herein disclosed embodiment is illustrative only, and that my invention is not limited thereto.

I claim:

1. Locking means for holding a load transfer car against movement along a pair of supporting track rails at a load transfer station, said transfer car having spaced transverse rails thereon for supporting a load carrying wheeled car in aligned registry with spaced fixed track rails at said station, comprising a frame for said transfer car, a flanged wheel rotatably mounted on said frame for cooperation with one of said pair of supporting track rails, an apertured support fixed on said frame adjacent said flanged wheel, and a set screw threadedly engaged with the aperture of said support and extending at substantially right angles to a plane side surface of said wheel, the outer end of said screw having an operating handle thereon and the opposite inner end of said screw being disposed in proximity to said wheel side surface adjacent its periphery, whereby manual rotation of said handle in one direction threadedly moves said screw axially relative to said fixed apertured support to engage its said inner end with the said wheel side surface to tilt said wheel whereby that portion of the flange adjacent the rail is urged to tight frictional engagement with said rail to hold the transfer car wheel against rotation and maintain said transfer car against movement along said supporting track rails at said station, manual rotation of said handle in the opposite direction releasing said inner end of said screw from frictional holding and tilting engagement with the wheel side surface to permit said transfer car to be moved to another station adjoining said rails.

2. Locking means for holding a load transfer car against movement along a pair of supporting track rails at a load transfer station, said transfer car having spaced transverse rails thereon for supporting a load carrying wheeled car in aligned registry with spaced fixed track rails at said station, comprising a frame for said transfer car, a wheel rotatably mounted on said frame for cooperation with one of said pair of supporting track rails, an apertured support fixed on said frame adjacent said wheel, and a set screw threadedly engaged with the aperture of said support and extending at substantially right angles to a plane side surface of said wheel, the outer end of said screw having an operating handle thereon and the opposite inner end of said screw having a cup point thereon disposed in proximity to said wheel side surface adjacent its periphery, whereby manual rotation of said handle in one direction threadedly moves said screw axially relative to said fixed apertured support to firmly lock its said cup point with the said wheel side surface and thus maintain said transfer car against movement on said supporting track rails at said station, manual rotation of said handle in the opposite direction releasing the point of said screw from locking engagement with the wheel side surface to permit said transfer car to be moved to another station adjoining said rails.

JOHN R. T. CLINGAN.

References Cited in the file of this patent

UNITED STATES PATENTS

| Number | Name | Date |
|---|---|---|
| 575,016 | Towne | Jan. 12, 1897 |
| 811,010 | Weber | Jan. 30, 1906 |
| 1,021,750 | Kleinman | Mar. 26, 1912 |
| 1,366,292 | Smith | Jan. 18, 1921 |
| 1,839,142 | Cullen | Dec. 29, 1931 |
| 2,269,753 | Benner | Jan. 13, 1942 |